United States Patent [19]

Watkins et al.

[11] Patent Number: 4,878,765

[45] Date of Patent: Nov. 7, 1989

[54] FLEXIBLE PACKAGING SHEETS AND PACKAGES FORMED THEREFROM

[75] Inventors: James D. Watkins, Prior Lake; David W. Andreas; David H. Cox, both of Minneapolis, all of Minn.

[73] Assignee: Golden Valley Microwave Foods, Inc., Edina, Minn.

[21] Appl. No.: 174,491

[22] Filed: Mar. 28, 1988

Related U.S. Application Data

[63] Continuation of Ser. No. 740,252, Jun. 3, 1985, Pat. No. 4,735,513.

[51] Int. Cl.⁴ .............................................. B65D 30/02
[52] U.S. Cl. .................................... 383/116; 156/265; 156/269; 156/272.2; 156/275.1; 156/292; 156/324; 219/10.55 E; 383/113; 426/113; 428/34.3; 428/35.4
[58] Field of Search ..................... 156/265, 269, 272.2, 156/275.1, 292, 324; 383/113, 116; 219/10.55 E; 426/113; 428/35, 537

[56] References Cited

U.S. PATENT DOCUMENTS

| | | | |
|---|---|---|---|
| 2,830,162 | 4/1958 | Copson et al. | 219/10.55 E |
| 3,302,632 | 2/1967 | Fichtner | 219/10.55 E |
| 3,327,136 | 4/1982 | Thompson et al. | 428/35 |
| 3,782,220 | 1/1974 | Tanizaki | 219/10.55 E |
| 3,835,280 | 9/1974 | Gades et al. | 219/10.55 E |
| 4,156,806 | 5/1979 | Teich et al. | 219/10.55 E |
| 4,158,760 | 6/1979 | Bowen et al. | 219/10.55 E |
| 4,166,208 | 8/1979 | Martel et al. | 219/10.55 E |
| 4,172,914 | 12/1987 | Festag et al. | 428/35 |
| 4,190,757 | 2/1980 | Turpin | 219/10.55 E |
| 4,204,336 | 5/1980 | Le Viet | 34/5 |
| 4,242,378 | 12/1980 | Arai | 427/264 |
| 4,264,668 | 4/1981 | Balla | 428/195 |
| 4,266,108 | 5/1981 | Anderson et al. | 219/10.55 E |
| 4,267,420 | 5/1981 | Brastad | 219/10.55 E |
| 4,283,427 | 8/1981 | Winters et al. | 219/10.55 R |
| 4,327,136 | 4/1982 | Thompson | 428/35 |
| 4,390,588 | 6/1983 | Ebneth et al. | 428/288 |
| 4,398,994 | 8/1983 | Beckett | 156/635 |
| 4,450,180 | 5/1984 | Watkins | 426/107 |
| 4,518,651 | 5/1985 | Wolfe | 428/308.8 |
| 4,548,826 | 10/1985 | Watkins | 426/394 |
| 4,553,010 | 11/1985 | Bohner et al. | 219/10.55 E |
| 4,555,605 | 11/1985 | Brown et al. | 219/10.55 E |
| 4,641,005 | 2/1987 | Sieferth | 426/107 |
| 4,678,882 | 2/1987 | Bohner et al. | 219/10.55 E |
| 4,713,510 | 12/1987 | Quick et al. | 219/10.55 E |

FOREIGN PATENT DOCUMENTS

1153069  8/1983  Canada .

OTHER PUBLICATIONS

*Modern Microelectronics* Book by Max Fogiel, (1972), pp. 80–100).

*Primary Examiner*—James J. Bell
*Attorney, Agent, or Firm*—James V. Harmon

[57] ABSTRACT

The invention provides a flexible packaging sheet including one or more supporting sheets and a base sheet to which is applied a microwave interactive material in the form of a coating or film. The microwave interactive material can comprise any of several element al metals or oxides such as iron oxide or tin oxide or a thin semiconductive metallic film applied by vacuum electrodeposition. The supporting sheets comprise nonthermoplastic fibrous sheet material such as paper. The base sheet can comprise a plastic resinous material such as polyester.

15 Claims, 3 Drawing Sheets

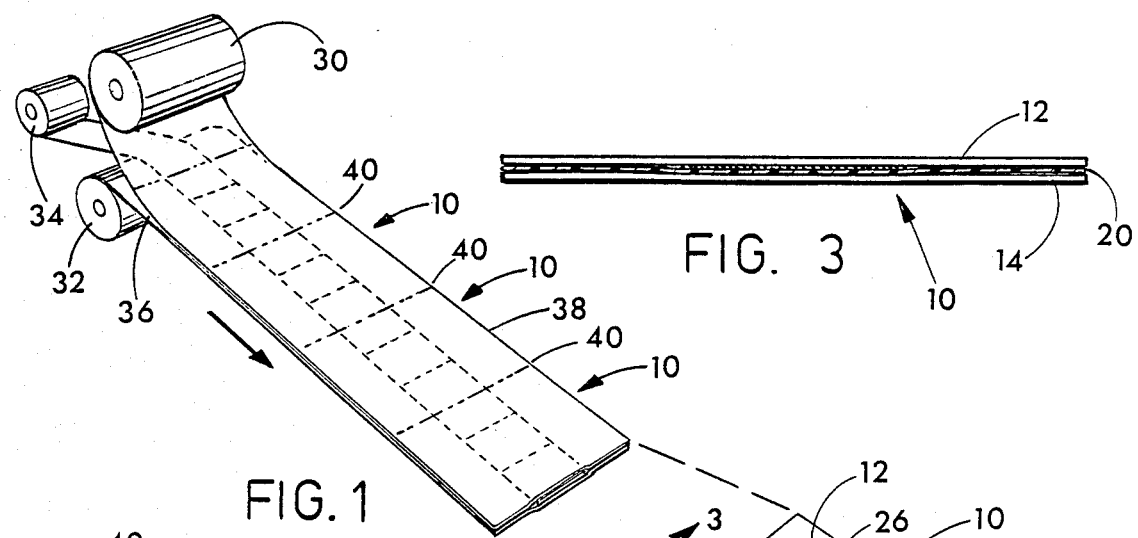
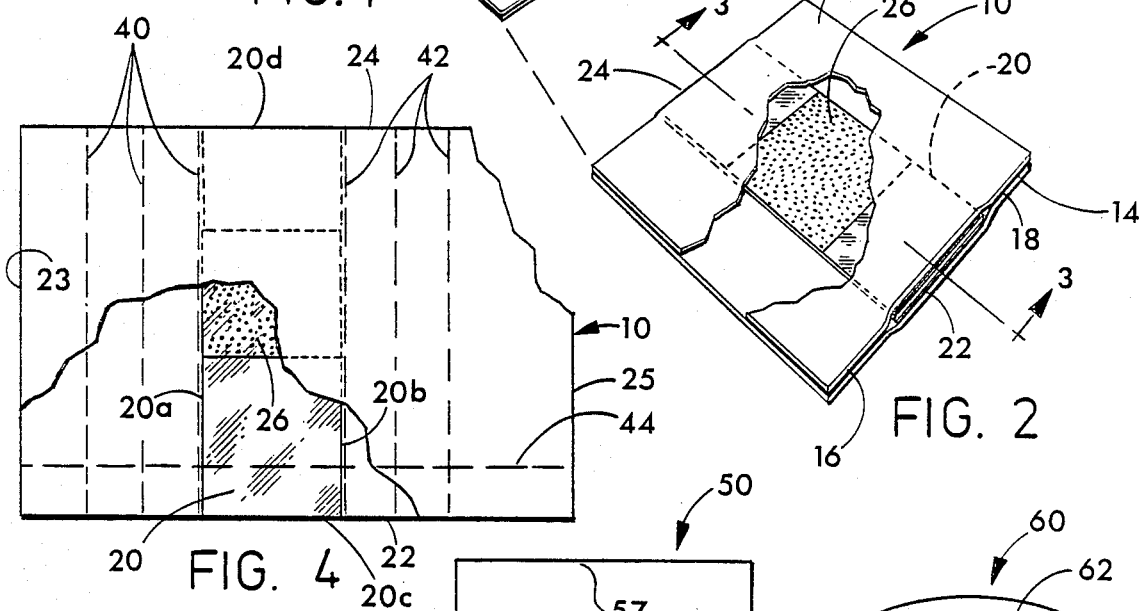
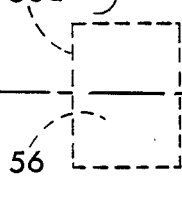

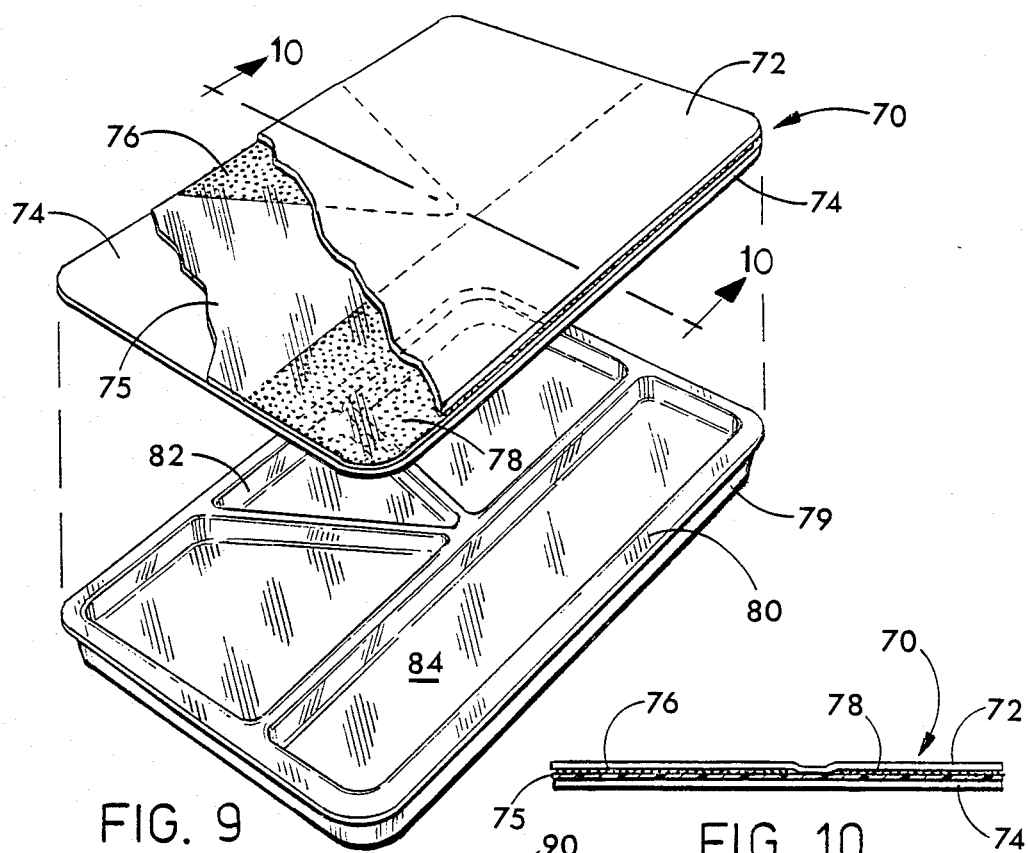
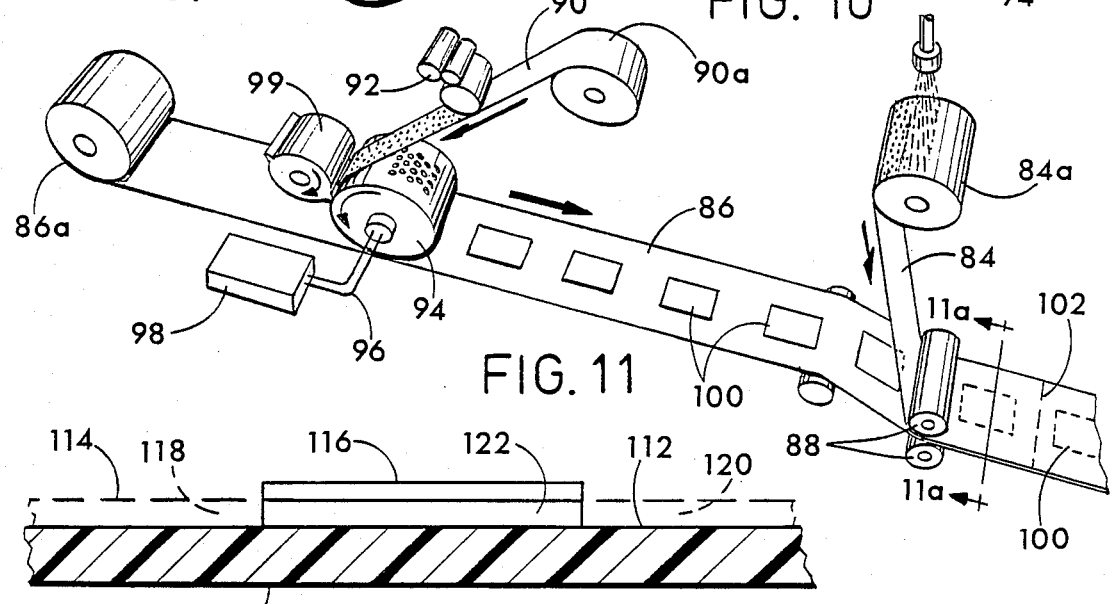

FLEXIBLE PACKAGING SHEETS AND PACKAGES FORMED THEREFROM

This is a continuation in part of application SN 740,252 filed June 3, 1985 and entitled FLEXIBLE PACKAGING SHEETS.

FIELD OF THE INVENTION

The present invention relates to packaging and more particularly to flexible packaging and to flexible laminates that are useful in packaging and shipping products.

BACKGROUND OF THE INVENTION

The present invention is concerned with the problem of providing a flexible packaging laminate which can be used in sheet form or in the form of a bag or other flexible container for heating articles in a microwave oven. Many products have been proposed for browning, searing or otherwise heating the surface of an article within a microwave oven. These prior products can be divided into three groups: rigid; semi-flexible or having limited flexibility; and flexible. Rigid heating containers are exemplified by the following U.S. Pat. Nos.: 4,266,108; 4,184,061; 4,450,334; 4,398,077; 4,166,208; 4,158,760; and 4,320,274. Among these, U.S. Pat. No. 4,266,108 describes a reflective metal plate such as an aluminum plate to which a layer of lossy materials, e.g. magnetic oxides known as ferrites, have been applied. These materials are bonded to the reflective metal plate which can be aluminum by means of an ntermediate layer containing a binder on an air gap. U.S. Pat. No. 4,184,061 describes a glass ceramic browning vessel with a metallic oxide coating on its lower surface. U.S. Pat. No. 4,450,334 is similar, except that in this cae a plastic layer containing a ferrite is applied to the bottom surface of an aluminum dish. In U.S. Pat. No. 4,398,077 a ceramic or glass dish is described having a resistive film 14 of tin oxide applied to its lower surface. Both of U.S. Pat. Nos. 4,166,208 and 4,158,760 describe conical containers formed from plastic. The lower end of each cone is in contact with the support member such as a block of plastic which is made lossy by the inclusion of metal or carbon particles. U.S. Pat. No. 4,320,270 describes a cooking utensil in the form of a dielectric dish, e.g., glass or plastic, having a metal layer extending through it.

Among references describing flexible packaging materials is U.S. Pat. No. 4,190,757 which describes a supporting substance in the form of aluminum foil which may be as little as one mil in thickness to which a paint-like layer of a ferrite or other lossy material is applied as a coating. For example, a wet mixture of taconite, sand and sodium silicate are blended and applied by brushing and rolling the composition onto a sheet of three mil aluminum to a thickness of 0.03 inches. The resulting laminate is fairly thick (over 30 mils in thickness) and is difficult to handle with automated roll stands and other equipment used for winding, rolling, cutting, transferring and forming sheet material into packages. Moreover, the laminate is heavy and the ferrite coating sometimes tends to flake off when the underlying aluminum sheet is bent or flexed.

U.S. Pat. Nos. 4,267,420 and 4,230,924 describe thin flexible polyester films or laminates of polyester and polyethylene to which a thin semiconducting coating is applied. This coating is typically aluminum which is evaporated onto the plastic film. In developing the present invention, films of this kind were tested experimentally. However, an important problem developed which rendered the patented sheets deficient in some applications. It was noted that a sheet or wrapper often extended away from the surface of the item being heated. The surface of the item being heated may also be irregular so that parts of the film do not conform to it. Moreover, the film often extended into portions of a package where the food product does not have access, e.g. bags or wrappers having a crimped end that did not contact the food. It was discovered that the portions which extended beyond the edges of the item being heated were especially subject to damage. Thus, after a few seconds of heating portions of the film shrank to $\frac{1}{3}$ of its original size or less and became melted in the process.

In one test, six cylindrical frozen fishsticks and six frozen chicken patties were each wrapped in a polyester film having a semiconducting evaporated aluminum coating of the type described in the Brastad patents. Each item was heated separately in a 625 watt Kenmore consumer type microwave oven. While a certain amount of surface crisping did take place, the unsupported portions of the film that were not in direct contact with the food shriveled and disintegrated. Unless the film was pressed against the surface it would not remain intact. The portion of the sheet material between the food and the underlying dish remained in one piece, but the tope and sides were particularly susceptible to damage. Especially where there were irregularities in the food, those portions of the film not in contact with the food would burn through. In the case of the chicken patties about 40% of the film became disintegrated and became perforated with holes or otherwise melted, pulling back on itself as it shriveled up after 1.5 minutes of heating at which time the heating was discontinued. It was noticed that the patties were not completely heated and the film did not appear to produce surface browning of the food. Performance was judged unsatisfactory and commercially unacceptable. Moreover, the film did not pull away from the food in a predictable way so that the kind of design changes that might be needed to correct the problem were not apparent.

In view of these and other deficiencies in the prior art it is the general objective of the present invention to provide an improved flexible sheet for packaging purposes and for producing heat in a microwave oven with the following characteristics and advantages:

(a) the ability to absorb microwave energy and transfer the absorbed energy to products in a microwave oven during a heating process without shrinking, burning, shriveling or disintegrating;

(b) the ability to perform satisfactorily although portions of the sheet extend away from and out of heat transfer relationship with the product being heated;

(c) sufficient flexibility to be wound, unwound, transferred either as cut sheets or a continuous film or formed into package structures such as bags and the like on conventional processing and gluing equipment used for packaging films and paper;

(d) the ability to carry out heating in certain selected areas and not in others;

(e) the provision for handling and transferring a film capable of heating products as a continuous uninterrupted strip or web wherein only certain portions of the web perform a heating function, (f) the provision of cut sheets of a microwave absorbing dimensionally unstable film are located at spaced locations and a provision is made for rendering them dimensionally stable; and (g) the provision of areas of any selected shape such as rectangular, triangular, hexagonal, circular areas, etc., are capable of heating while other surrounding areas of a flexible sheet have no heating function.

These and other more detailed and specific objects and advantages of the invention will become apparent in view of the following detailed description and accompanying drawings which set forth by way of example certain illustrative embodiments of the invention.

THE FIGURES

FIG. 1 is a diagrammatic perspective view illustrating a method of forming the laminate in accordance with one embodiment of the invention.

FIG. 2 is a perspective view on a larger scale of a cut sheet of a flexible laminated structure formed as shown in FIG. 1.

FIG. 3 is a transverse sectional view taken on line 3—3 of FIG. 2.

FIG. 4 is a plan view of a laminate in accordance with the present invention suitable for use in making a bag.

FIG. 5 is a bag formed from the laminated FIG. 4 on a somewhat reduced scale.

FIG. 6 is a plan view of another form of flexible laminate in accordance with the invention.

FIG. 7 is a transverse sectional view taken on line 7—7 of FIG. 6.

FIG. 8 is a perspective view of another form of laminate in accordance with the invention.

FIG. 9 is a perspective view of another laminate embodying the invention which is illustrated for use as a flexible lid of a food heating tray.

FIG. 10 is a transverse sectional view of the laminate taken on line 10—10 of FIG. 9.

FIG. 11 is a perspective view illustrating a method for forming a laminate in accordance with another embodiment of the invention.

FIG. 12 is a semi-diagrammatic transverse sectional view illustrating a method of forming a laminate having islands of heat-absorbing materials surrounded by areas that do not become heated.

SUMMARY OF THE INVENTION

Figure 14:
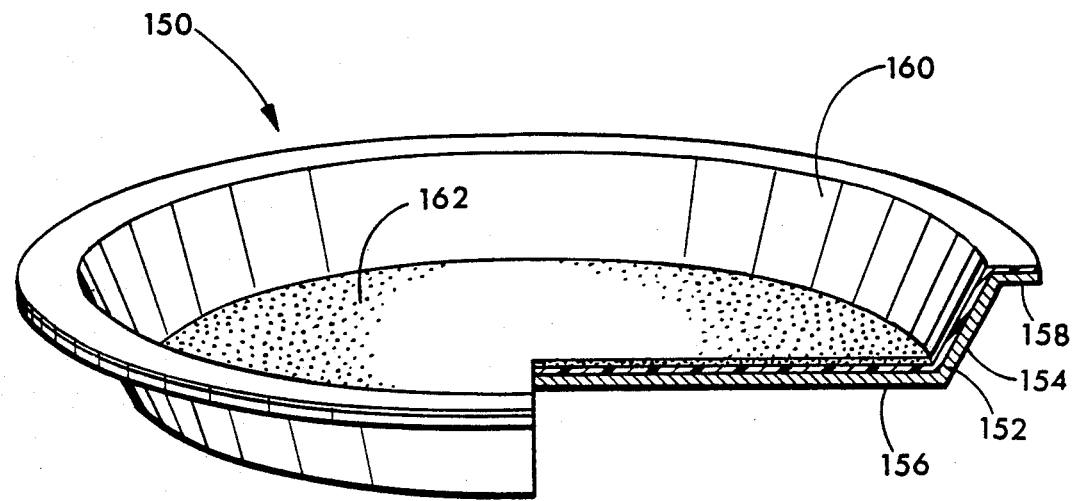
FIG. 14 is a perspective view partly broken away of another embodiment.

Briefly, one form of the invention provides a flexible sheet structure formed from a base sheet composed of a microwave transparent flexible sheet upon which is located one or more islands of a selectively positioned coating of microwave coupling material which absorbs microwave energy and becomes hot when exposed to microwave energy. When applied to the surface of an article to be heated, the article will absorb heat by conduction from the sheet in selected areas where the layer of microwave coupling material is provided but the sheet will allow the product to heat by direct microwave exposure through the flexible sheet material in uncoated areas. The coupling layer can comprise a self-supporting sheet or film, or it can comprise a coating applied from a fluid state such as a paint or lacquer or if desired a layer deposited by vacuum electrodeposition or electroplating.

More specifically, in one preferred embodiment of the invention the sheet structure comprises a laminate composed of a flexible backing sheet of dimensionally stable flexible material transparent to microwaves to which is applied a flexible base sheet of non-dimensionally stable plastic resinous film having a coating of microwaveabsorbing coupling material. In one preferred form of the invention the dimensionally stable backing sheet is a cellulosic material such as paper, cardboard, paperboard or synthetic sheet formed from synthetic plastic fibers of a non-thermoplastic and dimensionally stable composition. Other examples are non-thermoplastic thermoset polyamid fibers, melamine fibers and phenolic fibers. Primarily because of cost, at the present time paper is the most useful of the dimensionally stable backing sheets that can be used.

In a typical application of the invention, a plastic resinous base sheet having a microwave coupling coating such as a semiconductive metal coating is bonded for example by gluing to a dimensionally stable backing sheet composed of paper. In one preferred form of the invention the plastic sheet is the same size and shape as the paper while in another form of the invention the coated plastic sheet is smaller than the sheet of paper and its size and shape are carefully selected to produce special benefits. In another preferred form of the invention a single base sheet of flexible plastic is provided and on it is an island or area which covers only part of the base comprising a layer or coating of a microwave coupling substance adapted to absorb heat when exposed to microwave energy. The island or coated area may be of any selected shape, such as rectangular, triangular, circular, etc., but is usually the shape of the food product or other product to be heated. For example, if the product being heated is a hamburger patty, the island of microwave coupling material will have the shape and size of the hamburger patty and can be placed directly beneath it. The uncoated portions of the sheet can be folded up around the sides of the food or sealed to a similar sheet which lies in contact with the top surface of the food product. It was found that heat seals can be easily maintained since the uncoated laterally projecting sheet material does not absorb microwave energy which could melt or otherwise destroy a seal.

In another typical application of the invention, the microwave coupling material is applied to an underlying sheet of plastic resinous material which is laminated, i.e. bonded to an overlying sheet of paper. The microwave coupling coating may extend all the way to the edges of the paper or can be of a smaller size and of any selected shape, e.g., rectangular, circular, etc.

By contrast with the prior art, the sheet material of the present invention is surprisingly resistant to localized overheating, shriveling, melting or the formation of perforations. In a typical situation the sheet material of the present invention is placed around a food product such as a hamburger patty, french fries, etc., and is heated in a microwave oven for 4 to 6 minutes. After heating, the sheet material remains intact and is not deformed, melted or discolored. Moreover, heat is transferred very effectively to the food or other product and in spite of the high temperature reached, the paper is virtually never discolored, charred or otherwise damaged during the heating process. While the reason for this effectiveness is not known with certainty, it is believed to be primarily due to the greater mass of the paper and the fact that the paper was discovered to be dimensionally stable during heating. Thus, the mechanical integrity of the paper is apparently effective in keeping the sheet in place. It is theorized that the greater mass of the paper to some extent acts as a heat sink for the heat generated in the microwave coupling material. It is also speculated that the large surface area of the paper sheet as seen under a microscope helps to radiate excess energy to thereby act as a moderating factor where the unsupported sheet material is not in contact with the article being heated and in that way prevents runaway heating which could damage the sheet. In the embodiments of the invention where the dimensionally stable fiber sheet is not used, the island of microwave coupling material should have the same size and shape as the food or other product being heated and be in contact with it more or less uniformly in order to prevent damage to the sheet due to overheating in localized areas.

DESCRIPTION OF THE PREFERRED EMBODIMENTS

Refer now to FIGS. 1 through 5 which illustrate one embodiment of the invention and the method used for forming it. Shown in the figures is a flexible laminated sheet 10 consisting of rectangular upper and lower backing sheets of layers 12 and 14 of bleached kraft paper, each having a 30 pound basis weight. The upper and lower sheets of kraft paper 12 and 14 are laminated together by adhesive or paste suitably applied at 16 and 18 to an intermediate relatively thin base sheet 20 such as a 1 mil thick film of a resinous plastic such as a polyester film of rectangular shape extending all the way from the front edge 22 of the laminate to the rear edge 24. Applied to the center portion of the sheet 20 is a thin coating 26 of microwave coupling heat-absorbing material of the type that becomes very hot when heated in a microwave oven. The coating 26 can comprise any of the well-known microwave coupling materials such as semiconductive metal coatings, ferrites, certain metal oxides such as iron oxide, and particularly magnetite, all in powdered form, or coatings of the type described in the U.S. Pat Nos. 4,262,420 and 4,230,924. When a metallic coating is used it is preferably applied by vacuum electrodeposition and is semiconductive. The amount of metal applied during the electrodeposition process will control heating characteristics. As shown in FIG. 1, the laminate 10 can be formed by supplying the bleached kraft paper from two supply rolls 30 and 32 and the sheet 20 from a supply roll 34. The continuous strips of sheet material are brought together at 36 after adhesive is applied between the sheets by means of a suitable applicator (not shown) of any type known to those skilled in the art. The adhesive can be applied by spraying, brushing or by means of a roll-coater or the like. The strips from rolls 30, 32 and 34 are bonded together forming a web or strip 38 which travels from left to right in the figure and is cut transversely at longitudinally spaced intervals indicated by dotted lines 40. It was discovered that the kraft paper sheets function as a dimensionally stable backing for the base film 20 laminated between them. All of the sheets 12, 14 and 20 are flexible and transparent to microwave energy. After the strip 38 has been cut at intervals designated 40, the sheet 10 will be of rectangular shape having front edge 22 or rear edge 24 and side edges 23 and 25. The side edges of the sheet 20 are designated 20a and 20b. It can be seen that the front edge 20c and the rear edge 20d of sheet 20 are aligned with the front and rear edges of the complete sheet 10.

A laminate and other sheet material made in accordance with the invention has many applications. For example, it can be used as a tray liner, i.e. in flat sheet form to line a paperboard tray or other container, or if desired it can be layered between objects that are to be heated in a microwave oven. It can also be used as a wrapper, in which case the portions of the sheet that extend beyond the edges of the microwave coupling material 26 and absorb no heat can be wrapped or folded around the product that is to be heated. For example, as shown in FIGS. 4 and 5, sheet 10 can be provided with three left longitudinally extending fold lines 40 and three right longitudinally extending fold lines 42. When the sheet is folded along the fold lines 40 and 42 the edges 23 and 25 can be brought together in an overlapping relationship and sealed to each other by means of a suitable adhesive. The folds along the left fold line 40 define a left gusset as shown in FIG. 5 designed 40a and fold lines 42 define a right gusset 42a. A transversely extending bottom fold is provided at 44 and it is along this line that the bottom portion of the sheet can be foled upwardly and bonded to the underlying sheet material to form a bottom seal or closure 46. In this way, the sheet material 10 of the present invention is formed into a flexible paper bag that has a centrally located rectangular heat-absorbing area 26.

The laminate illustrated in FIGS. 1 through 5 provides excellent heating results either in flat sheet form as a wrapper or formed into a bag as shown in FIGS. 4 and 5. It is not subject to damage during the heating cycle. Even areas not in contact with the food will not be damaged. It appears critical that the film supporting the microwave coupling coating be bonded securely to the dimensionally stable base sheets 12 and 14. It was found that if the portions of the sheet 20 become loosened from the sheet 12 or 14 they will become subject to runaway heating and damage. It is preferred to have the coated sheet 20 trapped between two layers of paper but this is not essential. In some applications where the product to be heated has a smooth surface and is fairly large in mass, a single layer of paper 12 is satisfactory and layer 14 can be eliminated. A layer of paper will also keep food away from the metal coating 26 which is desirable in some applications. It was surprising to find that in spite of the heat insulating qualities of the paper, the heat within the sheet 20 which may reach 600° F. was readily conducted through the paper layer 12 to the food or other product being heated. It was found that a pair of paper sheets 12 and 14 provide a stronger support structure and maintain package dimensions better, i.e. prevent the sheet material from curling or bending. In addition, a pair of paper sheets as shown makes the laminate more tolerant with respect to the kinds of adhesives that will work for forming the laminate because it is more difficult to reliably bond the coated plastic sheet to a single sheet of paper than to two sheets. This advantage of having two stabilizing backing sheets is important since the metal coated film will shrink or melt wherever it separates from the underlying paper sheet. For these three reasons the pair of backing sheets, one on each side of the microwave coupling sheet 20 is preferred to a single sheet of paper 12. Other suitable backing sheets will be apparent to those skilled in the art. The laminate described in FIGS. 1 through 5 has proved effective in heating products faster than without such a sheet and with some products can provide surface browning or crisping.

Typical foods for which the invention is suited include popcorn, hamburger, french fries and pizza. It can also be used for heating battered or breaded food products such as breaded chicken, prepared waffles, etc. In the case of popcorn, the laminate can be formed into a bag. With the other three foods the laminate can be used in flat sheet form as shown in FIG. 2. If layer 26 is a metal, it is preferably aluminum but other metals such as stainless steel, copper, gold and the like can be used. It is preferred that the metal layer 26, if formed of aluminum, transmit approximately 40% to 60% of the incident light. If over 60% is transmitted, heating is generally too slow to be of value. If below 40%, electrical discharges begin to occur in the sheet which begins to burn the film 40. While 0.5 mil polyester film has been found satisfactory as a base for supporting the microwave coupling layer, the base film can be composed of other materials such as polycarbonate or polyamid resin. One suitable adhesive is a thermosetting polyvinyl acetate emulsion adhesive which can be obtained for example from Franklin International, Inc., Columbus, Ohio, under the trade name Duracet 12. Other polyvinyl acetate resin-based emulsion adhesives are also suitable such as Elektromek vinylacetate copolymer adhesive supplied by the Elektromek Company, Carlstadt, New Jersey.

The invention as disclosed in FIGS. 1 through 5 provides a three-ply laminate having a microwave coupling heat absorbing layer in selected areas and lacking such a coating in other areas. The dimensional stability added by the backing sheet keeps the coupling sheet from shrinking, warping or melting and also helps to keep the laminate in contact with the greater mass of the product being heated which serves as a heat sink to keep the temperature of the laminate under control.

Refer now to FIG. 6 and 7 which illustrate a laminate 50 in the form of a composite flexible rectangular sheet of paper 52 bonded by means of a suitable adhesive to an underlying layer of plastic film 54 of the same size and shape. Any suitable adhesive can be used such as a resin emulsion type adhesive. Deposited on the surface of the film 54 is a layer or coating of a microwave coupling substance which will become very hot when subjected to microwave heating. Any of the above-mentioned materials will be astisfactory. Electrodeposited metal is the most preferred.

It will be seen that the coating 56 has a peripheral edge 56a, in this case of rectangular shape, which is spaced inwardly a substantial distance from the periphery 52a of the laminate 50. In this way the laminate 50 is provided with the microwave coupling material in a selected area while other areas, namely the space 57 between the coating 56 and the edge 52a, are uncoated and will not become heated when placed in a microwave oven. Consequently, even if these areas are out of contact with the food or other product to be heated they will not become scorched, burned, shrunken or otherwise damaged.

Refer now to FIG. 8 which illustrates another embodiment of the invention. Shown in FIG. 8 is a flexible laminate 60 of circular shape comprising upper and lower paper sheets 62 and 64 of the same size and shape bonded by means of a suitable adhesive to an intermediate plastic film layer 66. On the upper surface of layer 66 is coated a microwave coupling material 67 that will become hot in a microwave oven. It can be seen that in this case the coupling material 67 extends all the way to the edges of the sheet 60 rather than covering a selected fractional area of the sheet 60. This laminate can be used for variety of purposes but is preferably cut to the same shape of the object being heated so that its edges do not extend laterally beyond it. For example if the sheet 60 is to be used for heating a hamnburger patty, the sheet 60 should be of approximately the same shape and size or slightly smaller. The hamburger patty can be pressed to the top of such a sheet or pressed between a pair of such sheets prior to microwave heating. During microwave heating, the contacting surfaces of the patty will be heated by conduction from the sheet 60 and will become much hotter than the other surface. Sheet 60 will also sear or brown the surfaces in contact with it.

The sheet 60 can also be used as a liner for the bottom of a plastic T.V. dinner tray or as a liner for the bottom and top, if desired, of a package of french fried potatoes. In a preferred form of the embodiment shown in the FIG. 8, the laminate consists of upper and lower sheets composed of machine glazed kraft paper having a basis weight of 25 to 50 pounds per ream. The base 66 can comprise 0.5 mil polyester film with aluminum 67 electrodeposited in sufficient quantity to transmit about 45 to 55 percent of the incident light. One or both of the kraft layers 62 or 64 can be composed of grease-proof kraft paper or grease stain resistant kraft paper which is available commercially.

Refer now to FIGS. 9 and 10 which illustrate another embodiment of the invention wherein the microwave coupling layer has a selected pattern covering an area smaller than the overall size of the sheet. In FIGS. 9 and 10 a flexible laminate 70 of the thickness of which has been exaggerated for purposes of illustration, comprises upper and lower dimensionally stabilizing paper layers 72 and 74 with an intermediate layer of plastic film such as 1 mil polyester film 75 to which is applied a triangular coating of microwave coupling material 76 on one side of a sheet and a rectangular area of a similar material 78 on the other side. The flexible laminate 70 is composed of the same materials used in connection with the embodiments already described. Bonding is accomplished with any suitable adhesive. The laminate 70 is composed of the same materials used in connection with the embodiments already described. Bonding is accomplished with any suitable adhesive. The laminate 70 can be used as a removable cover for a plastic ready-to-heat dinner tray 79 and is sealed around the entire upper edge thereof at 80. The triangular and rectangular areas 76 and 78 are above tray compartments 82 and 84 and will heat the surfaces of the food contained in them to a much higher temperature than in the other compartments of the tray. In this way the surfaces of the food, e.g. a steak or potato product can be seared or crisped.

Figure 11A:
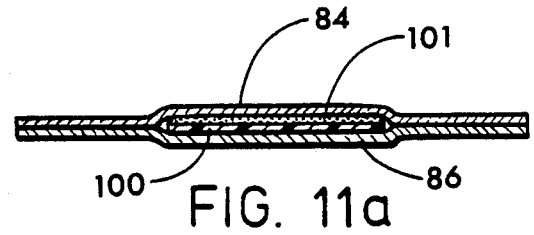
FIG. 11a is a sectional view on a larger scale taken on line 11a—11a of FIG. 11.

Refer now to FIG. 11 which illustrates a method of forming another kind of laminate in accordance with the invention. As shown in the figures a pair of paper webs 84 and 86 traveling in given feed directions from supply rolls 84a and 86a are brought together between the nip of a roll pair 88. An intermediate layer of plastic film 90 which is coated with a microwave coupling coating of the type described above is supplied from roll 90a. The coating can be any of the types described above. As the strip of film 90 travels downwardly, adhesive is applied from supply roll 92. The film then travels over a rotating vacuum roll 94 having perforations in its surface that communicate through a pipe 96 with a vacuum pump 98 to retain the film 90 on its surface as it passes a transverse cutting roll 99 which severs the film 90 at spaced intervals into separate sheets 100 which are brought down into contact with the upper surface of the web 86 and are deposited at spaced apart points owing to the relatively slower speed of the strip 90 and roll 94. In this way the sheets 100 will be bonded between the web 84 and 86 and consequently can be spaced apart from its edges. The resulting laminate can be cut apart along transverse lines 102 between the sheets 100. As shown in FIG. 11a the cut sheets 100 are provided on their upper surface with a semiconductive microwave coupling coating layer 101. The film 100 is stabilized by the overlying dimensionally stabilizing paper sheets 84 and 86.

Refer now to FIG. 12 which illustrates a coated film in accordance with the invention and method for forming it. As shown in the figures a backing sheet such as a 0.5 to 3.0 mil flexible polyester film 110 is initially coated on its entire upper surface 112 with a layer 114 of a microwave coupling material having any of the compositions described herein. Over the coupling material is applied a protective varnish 116 covering an area of a selected size and shape which is smaller than that of the backing sheet 110. For example, the varnish 116 may have triangular or rectangular shapes such as the pattern shown at 76 and 78 of FIG. 9, or of any other shape and repeat pattern along the length of the continuous web. Following the application of varnish 116, the laminate is exposed to a caustic bath to dissolve away the material at 118 and 120 and leave an island 122 of microwave coupling material of the desired pattern that is protected from the caustic bath by the varnish 116. This method can be referred to as pattern demetalization.

Figure 13:
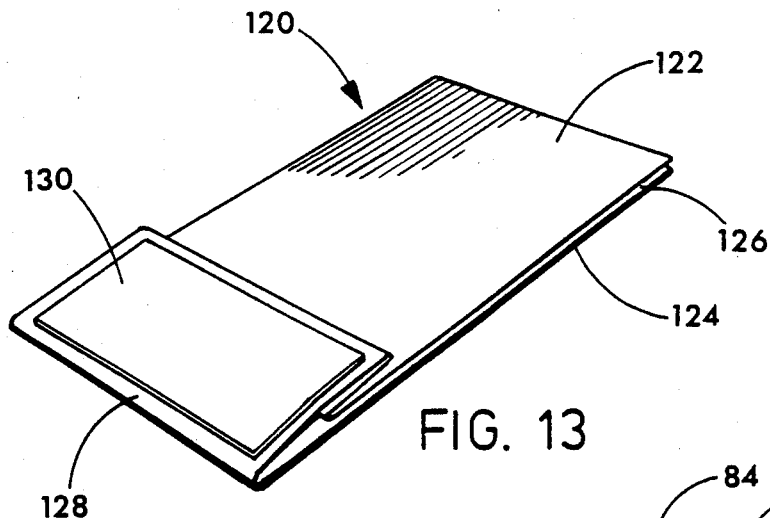
FIG. 13 is a perspective view of a bag illustrating another application of the invention.

Refer now to FIG. 13 which illustrates another method of employing laminates in accordance with the invention. Shown in the figures is a flexible paper bag 120 formed from kraft paper and having front and rear panels 122 and 124, side gussets, only the one designated 26 being visible, and a bottom wall 128. To the bottom wall 128 is pasted or otherwise adhesively bonded a sheet 130 of substantially the same shape as the bottom wall 128. The sheet 130 has the same composition and structure as either of the laminates 50 or 60. If of the type shown in FIG. 6, the border portion 57 that does not become heated should be made smaller or eliminated. If the laminate 60 is used, it should be cut to rectangular shape to fit the bottom panel 128. The stabilizing paper layer used in the laminate 130 has important benefits. It helps the coated plastic film retain its dimensional stability and aids in bonding the laminate reliably to the underlying sheet material of the bag 120. In this way the chance for damage to the laminate caused by overheating is minimized and all parts of the laminate can be reliably bonded to the bag.

In FIG. 14 is illustrated a paper dish 150 that is pressed into a dish shape between a pair of mating forming dies. The dish has a side wall 154 and bottom wall 156 in this case of circular shape, and a rim 158. To the upper surface of the dish is bonded a polyester film 160 which because of its very light weight takes on the same shape as the paper tray 150. At the center only of the polyester film is a coating 162 of a microwave coupling material in any of the compositions already described. It will be noted that only a selected portion of the dish and the underlying carrier film 160 are coated. As a result, heating will be localized in a specific selected area, in this case the bottom wall of the dish 150. Again, the dimensionally stable paper backing 152 acts as a support for maintaining the coupling material 162 in place and for preventing overheating or melting.

Laminates manufactured in accordance with the present invention are highly effective in venting and thereby eliminating gaseous byproducts that may form in the laminate during the heating process. For example, the laminates of FIGS. 6 and 7 comprise a paper layer 52 and a plastic film layer 54 with a microwave interactive layer 56 between them. Similarly with respect to FIG. 8, one of the layers 62, 64 can be a greaseproof kraft paper while the other layer is ordinary kraft paper. Again, in connection with the embodiment of FIGS. 11 and 11a there is provided a plastic film backing 100 and a paper layer 84 with a microwave interactive layer 101 between the plastic film 100 and the paper 84. In each case, these laminates consist of one layer, e.g. lastic film, which is relatively impervious to gases or vapors that may be produced in the heating process and a relatively porous layer, e.g. kraft paper, which is pervious to any such vapors or gases including even potentially toxic fumes, if any, that may be produced during a heating cycle in a microwave oven.

This characteristic of the invention is important because the food can be placed on the side of the laminate having the relatively gas impervious layer, e.g. greaseproof paper, glassine paper, siliconized paper, etc. or other similar relatively gas impervious sheet material, while the porous or gas pervious layer such as kraft paper is on the opposite side of the microwave interactive material, i.e. the outside of the package, that is to say, the surface away from the food product. From this it can be seen that the laminates in accordance with the present invention provide a porosity differential between the inner and outer sheets such as sheets 52 and 54. This provides the unexpected benefit of reliably venting and thereby eliminating vapors, fumes or gases produced by outgassing from any substances contained in the laminate which during the heating operation may reach relatively high temperatures, e.g. 400° F. to 500° F.; hot enough so that some of the packaging materials therein may become lightly charred during the heating process. However, by using the invention, any volatiles that are produced including smoke fumes, vapor or potentially toxic materials are safely vented through the relatively porous layer to the outside of the laminate and away from the food product which is on the opposite side thereof.

The invention has other advantages. The inner, relatively gas impervious layer, e.g. layer 54 (FIG. 7) or layer 100 (FIG. 11a) is non-absorbent with respect to the food in the package. This will prevent the fluid contained in the food from leaching undesirable substances from the microwave interactive layer 106 or 101. For example, if the food product has a high fat content a plastic sheet or a grease resistant kraft sheet is used as the inner lamina. If the food has a high moisture content, the inner layer 54 or 86 and 100 should be non-absorptive with respect to moisture. Many plastic films known to the art will perform this function. In this way the food product will not absorb components of the package or substances produced by the intense heat generated by the interactive layer during the cooking operation.

Many variations within the scope of the appended claims will be apparent to those skilled in the art once the principles described herein are understood.

What is claimed is:

1. A flexible laminate folded into the form of a bag, said bag enclosing a food product adapted to be heated within the bag in a microwave oven, said laminate comprising,
   an enclosed layer of a microwave interactive coupling material comprising a lossy substance which becomes hot within a microwave oven,
   said microwave interactive layer being positioned within only that portion of said laminate located beneath the food product when the food product is heated in the bag within a microwave oven,
   said microwave interactive layer being incorporated into a wall of the bag supporting the food product during heating whereby the food is adapted to rest upon the laminate in heat conductive relationship with the microwave interactive layer therebeneath,
   said laminate including at least two layers of flexible backing sheet material one of which is an inner layer positioned between the interactive layer and the food product, one of said backing sheets being bonded to each side of the microwave interactive layer to form a sandwich structure in which the microwave interactive layer is encapsulated by being enclosed between the flexible backing sheets on each side thereof,
   at least the inner layer of backing sheet material being composed of nonthermoplastic cellulosic fibers that assist in preserving the integrity and dimensions of the interactive layer upon exposure to microwave energy, and
   during heating, the heat being transferred from the interactive layer by conduction to the overlying food product whereby the food is heated by the heat transferred from the microwave interactive layer through the inner backing sheet to raise the temperature of the food body by heating one surface thereof without damaging portions of the bag remote from the food.

2. The article of claim 1 wherein the microwave interactive layer is a coating layer applied to one of said backing sheets as a coating thereon and the coating layer being bonded throughout to the backing sheet other thn the one upon which it is coated whereby the backing sheets help to stabilize the coating layer and reduce scorching thereof.

3. The article of claim 2 wherein one of the backing sheets comprises a flexible layer of plastic film and the microwave interactive material is a coating layer deposited upon said plastic film.

4. The article of claim 3 wherein the microwave interactive layer comprises a coating deposited upon a microwave transparent flexible sheet interposed as a base layer between the two backing layers and being bonded thereto on each side thereof.

5. A laminate including at least three layers and being suited for wrapping, packaging and shipping a food product that is to be heated in a microwave oven, a food product enclosed within the flexible laminate, said laminate comprising inner and outer layers of flexible material having a porosity differential, said inner layer is a relatively gas and vapor impervious sheet of non-thermoplastic fibers in contact with or close proximity to the food product, said outer layer comprising a relatively porous material that has sufficient porosity for venting and thereby eliminating volatile fumes, smoke or vapor or gas produced by outgassing within the laminate during heating of the food in the microwave oven, and a layer of microwave interactive coupling material which becomes hot when exposed to microwave energy interposed between the inner layer and outer porous layer to achieve heating of the food product through conduction of heat from the microwave interactive coupling material to the food product by conduction through the relatively impervious inner layer, whereby during the heating process contact between the vapor, fumes and gas and the food product is thereby substantially reduced by the venting thereof through the relatively porous layer into the atmosphere.

6. The laminate of claim 5 wherein the inner sheet comprises greaseproof kraft paper and the outer layer comprises a paper sheet.

7. The laminate of claim 5 wherein the layer of microwave coupling material includes a synthetic plastic resinous film and the outer layer comprises a paper sheet.

8. The laminate of claim 5 wherein said laminate includes a base sheet formed from a sheet of plastic resinous film and on an outside surface thereof is applied said layer of microwave interactive material to produce heating in a microwave oven and said outer layer of relatively porous material is applied to the outside of said microwave interactive layer on the opposite side thereof from said food product to define the outside surface of the laminate when the laminate is used for wrapping, packaging and shipping one of said food articles.

9. The laminate of claim 5 wherein the said inner sheet comprises a sheet that is relatively nonabsorptive with respect to the food product whereby the food product will not leach potentially harmful substances from the microwave interactive layer during heating.

10. A method of forming a flexible laminate including at least three layers suited for wrapping, packaging and shipping food articles that are to be heated in a microwave oven comprising the steps of providing a base sheet having a microwave interactive coupling composition thereon, providing inner and outer support sheets of dimensionally stable flexible microwave transparent material, providing the inner and outer microwave transparent flexible sheets in strip form, advancing the sheets toward one another, applying adhesive to at least one of said sheets, said base sheet being dimensioned and arranged to be of a size smaller than the other sheets whereby the other sheets overlap the base sheet, bringing the other sheets together on opposite sides of the base sheet whereby the base sheet is bonded between the inner and outer sheets and is spaced apart from at least some of the edges of the support sheets, and thereafter sequentially cutting the resulting laminated structure apart along spaced lines to provide separate three-layer laminates wherein the base sheet is sealed between said inner and outer support sheets to form a three-layer sandwich structure.

11. The method of claim 10 wherein at least one of the support sheets comprises paper.

12. The method of claim 10 wherein a porosity differential is provided between said inner and outer sheets whereby the inner sheet is relatively gas and/or vapor impervious and the outer sheet is relatively gas and vapor transmissive.

13. The method of claim 10 wherein the base sheet comprises a synthetic plastic resinous sheet, said plastic resinous sheet is a strip and said strip is severed to divide said strip of base sheet material into separate patches of plastic resinous sheet material and the patches are sequentially applied at spaced apart intervals between said inner and outer sheets prior to bringing said inner and outer sheets into contact with one another to thereby support the patches on opposite sides thereof and to extend beyond the edges of the patches on at least some sides thereof.

14. A method of forming a flexible sheet structure for microwave heating comprising, providing a base sheet composed of microwave transparent flexible sheet material, providing a thin layer of microwave coupling material as an island which becomes hot when exposed to microwave energy, positioning said layer selectively on a portion of said base sheet to achieve heating of a product that is to be heated through conductive heating from the layer of microwave coupling material in the selected area where the coupling material is located, and other portions of the base sheet remaining unheated when exposed to microwave energy.

15. A method of forming a flexible laminate including at least three layers suited for wrapping, packaging and shipping food articles that are to be heated in a microwave oven comprising, providing a base sheet composed of microwave transparent flexible sheet material coated on at least one surface with a layer of microwave interactive coupling material which becomes hot when exposed to microwave energy and being susceptible to melting, shrinking, warping and/or shriveling when exposed to microwave energy, positioning said base sheet on a selected portion of the laminate to achieve heating of said food product through conduction of heat from the layer of microwave interactive coupling material to the food article in a selected area where the coupling material is located while other portions of the laminate remain unheated when exposed to microwave energy, providing two layers of dimensionally stable flexible backing sheet material, bonding one such backing sheet to each side of the base sheet to form a sandwich structure in which the base sheet is encapsulated and dimensionally stabilized by the enclosing flexible backing sheets on each side thereof, said backing sheets being composed of non-thermoplastic fibers that assist in preserving the integrity, dimensions and shape of the base sheet when the base sheet is exposed to microwave energy, and allowing the heat to transfer from the base sheet through one of the dimensionally stable fibrous backing sheets to the food product by thermal conduction and without disturbing the fibrous structure.

* * * * *